United States Patent [19]

Siegel

[11] 4,278,222
[45] Jul. 14, 1981

[54] MUSICAL INSTRUMENT STAND

[76] Inventor: Alan G. Siegel, 7811 N. Fairchild Rd., Milwaukee, Wis. 53217

[21] Appl. No.: 27,861

[22] Filed: Apr. 6, 1979

[51] Int. Cl.³ .............................................. F16L 3/00
[52] U.S. Cl. .................................... 248/121; 248/176
[58] Field of Search ............... 248/176, 177, 178, 121, 248/122, 124, 125, 169, 159, 165; 84/327

[56] References Cited

U.S. PATENT DOCUMENTS

| | | | |
|---|---|---|---|
| 491,277 | 2/1893 | Berger | 248/159 X |
| 1,175,352 | 3/1916 | Hand | 248/156 |
| 1,900,718 | 3/1933 | Lang | 248/121 UX |
| 2,153,821 | 4/1939 | Walberg | 248/121 |
| 2,282,285 | 5/1942 | Olson | 248/169 |
| 2,329,932 | 9/1943 | Nelson | 248/125 |
| 2,696,963 | 12/1954 | Shepherd | 248/125 X |
| 3,357,666 | 12/1967 | Smith et al. | 248/125 |
| 3,503,581 | 3/1970 | Rouleau | 248/121 |
| 3,908,945 | 9/1975 | Shapiro | 248/165 |
| 4,036,462 | 7/1977 | Sheftel | 211/13 X |

Primary Examiner—J. Franklin Foss
Attorney, Agent, or Firm—Marvin Feldman; Stephen E. Feldman

[57] ABSTRACT

A stand for supporting any one of a plurality of hollow musical instruments (e.g., piccolo, flute, or alto flute) featuring inner and outer telescoping shafts fastened by a clutch collar, the collar and extended inner shaft supporting one instrument, and a top member with an elongated extension and enlarged base supporting another instrument.

9 Claims, 14 Drawing Figures

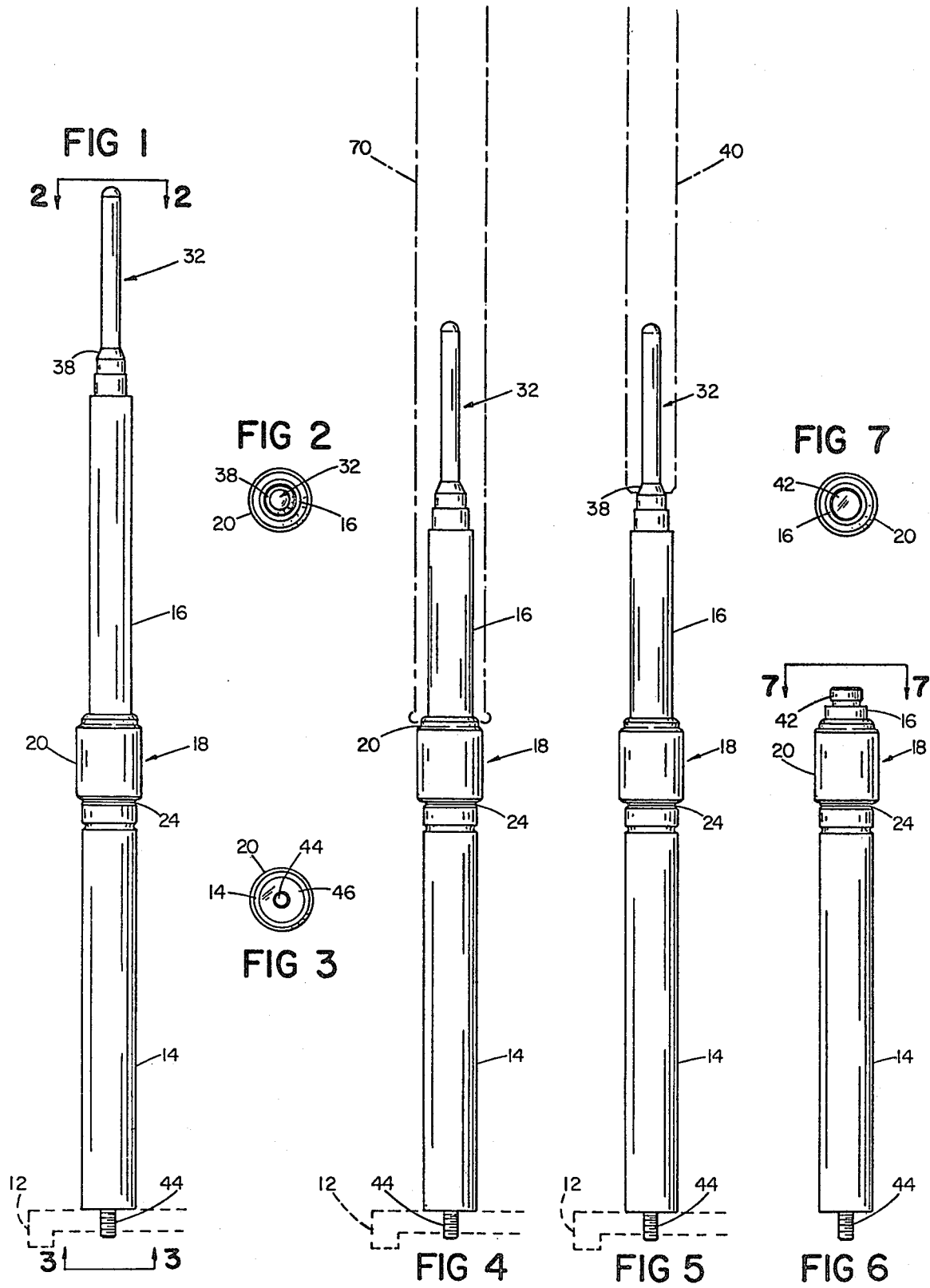

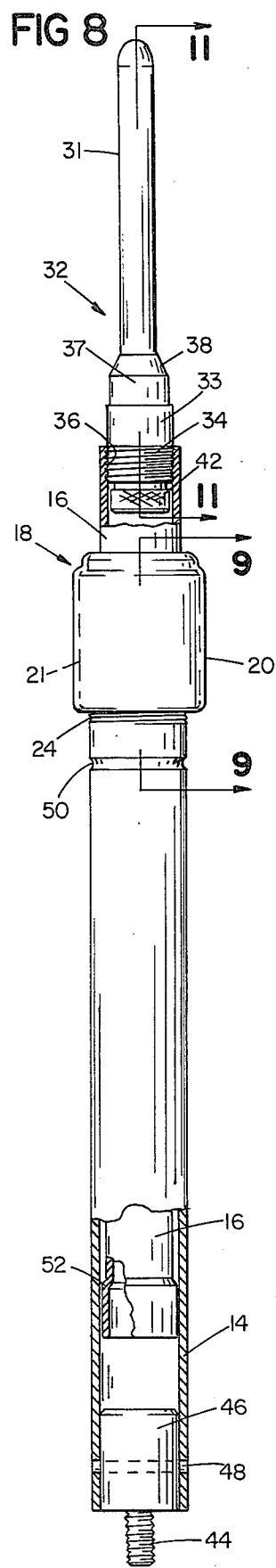
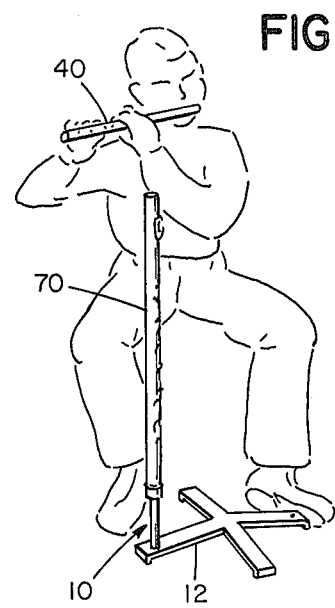
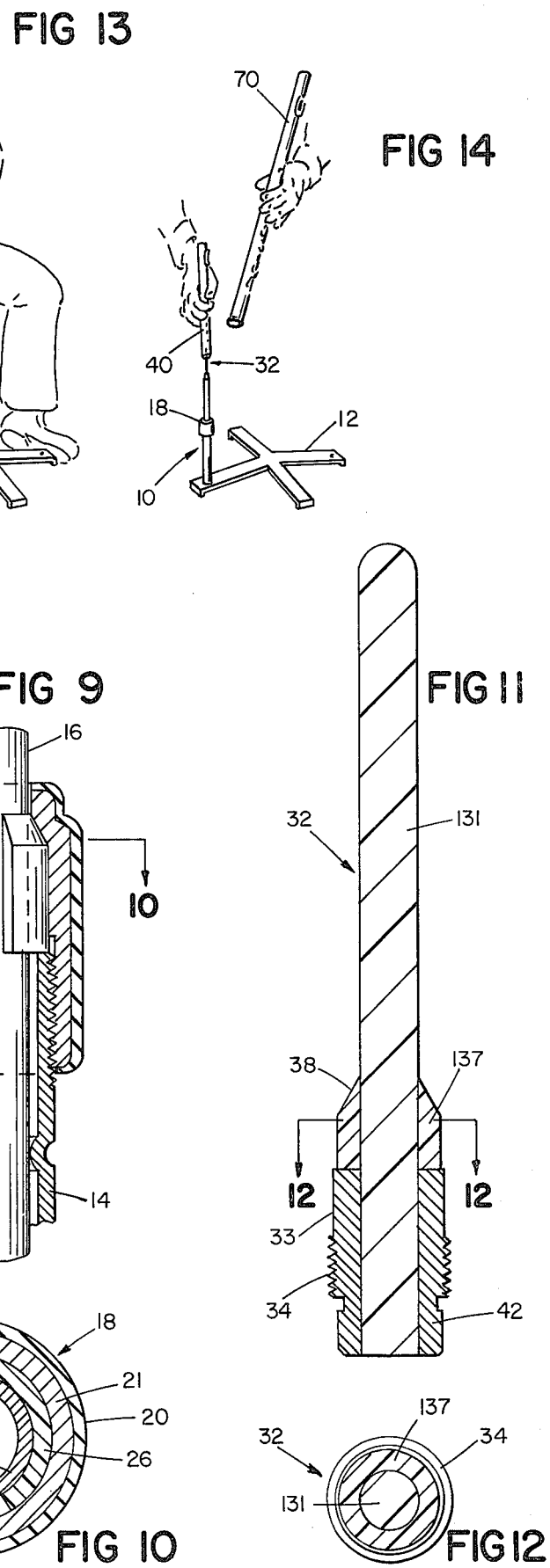

4,278,222

MUSICAL INSTRUMENT STAND

FIELD OF THE INVENTION

This invention concerns stands for musical instruments.

BACKGROUND OF THE INVENTION

Flute players often alternate between more than one instrument (e.g., piccolo, flute, or alto flute). In doing so the player needs a stand that protects the delicate surfaces of the instruments (e.g., gold and fine wood), is convenient to use, is adjustable to the height of various players, and is collapsable.

Although there are many stands available for musical instruments, none satisfactorily meet these needs. Naujoks et al. U.S. Pat. No. 1,773,237 and Cashiojop U.S. Pat. No. 2,522,345 show two flared plugs supported on a base for supporting the flared ends of clarinets.

SUMMARY OF THE INVENTION

I have found that the needed attributes of convenience, adjustability, collapsability, and instrument protection can be had in a simple, rugged, and inexpensive stand. The stand of my invention features inner and outer telescoping hollow shafts and a top member, the two shafts being extendable to provide height adjustment by means of a clutch collar, the inner shaft being sized to fit within a first hollow musical instrument (e.g., a flute) the clutch collar having an annular surface for supporting the end of the first instrument, and the top member having an elongated extension for protruding inside of a second hollow musical instrument (e.g., a piccolo), a enlarged annular portion, preferably a part of the top member, supporting the end of the second instrument.

In preferred embodiments, the first instrument is a flute; the second instrument is a piccolo; the outer shaft is sized to fit within and support an alto flute or recorder; the top member is threaded to the inner shaft and can be unthreaded and re-threaded in reverse, telescoped position, and the inner shaft containing the reversed top member can be slid fully inside the outer shaft, all for compact storage; and the top member and collar have nylon or other deformable materials in contact with the instruments to protect the delicate surfaces of the latter.

PREFERRED EMBODIMENT

The structure and operation of a preferred embodiment of the invention will now be described, after first briefly describing the drawings.

DRAWINGS

FIG. 1 is an elevation view of said embodiment in its fully-extended condition.

FIG. 2 is a view looking downward at 2—2 in FIG. 1.

FIG. 3 is a view looking upward at 3—3 in FIG. 1.

FIG. 4 is a elevation view of said embodiment, showing a flute installed.

FIG. 5 is an elevation view of said embodiment showing a piccolo installed.

FIG. 6 is an elevation view of said embodiment in its collapsed condition.

FIG. 7 is a view looking downward at 7—7 in FIG. 6.

FIG. 8 is an elevation view, partially cross sectioned, of said embodiment.

FIG. 9 is a cross-sectional view at 9—9 of FIG. 8.

FIG. 10 is a horizontal cross-sectional view at 10—10 of FIG. 9.

FIG. 11 is a vertical cross-sectional view at 11—11 of FIG. 8, showing an alternative embodiment of the top member for supporting a piccolo.

FIG. 12 is a cross-sectional view at 12—12 of FIG. 11.

FIG. 13 is a perspective view showing a flute installed on said embodiment while a piccolo is played.

FIG. 14 is a perspective view of said embodiment showing the piccolo being substituted for the flute.

STRUCTURE

There is shown in the figures a stand indicated generally at 10 for hollow tubular musical instruments, such as a piccolo, flute, or alto flute. The stand 10 can be installed at one end of base 12 (FIGS. 13 and 14).

The stand consists of two hollow tubular shafts 14, 16, inner shaft 16 being telescopically received in outer shaft 14. A conventional clutch collar 18 (FIG. 9) is used to adjust the height of inner shaft 16. The clutch collar has a rubber exterior sleeve 20 and a metal collar 21 with internal threads 22, which engage external threads 24 at the upper end of outer shaft 14. Tightening of the collar by turning threads 22, 24 tightens the grip of inner element 26 on inner shaft 16. Inner element 26 is a broken ring with a frustoconical upper surface 28, which cooperates with frustoconical surface 30 of the collar to provide the gripping action. Element 26 rests on the top of shaft 14.

Affixed to the upper end of inner shaft 16 is top member 32, consisting of an elongated rod 31 of nylon (or wood) with integral enlarged base 37, all press fitted into metal base 33, which has external threads 34. The threads engage internal threads 36 at the upper end of shaft 16. Enlarged base 37 has annular, flared-outward surface 38 providing a stop-surface for a piccolo 40 (FIG. 5). The upper end of rod 31 is rounded to guide the piccolo and other instruments onto the stand. The lower end of member 32, below threads 34, has knurled surface 42 for facilitating removal of member 32 from inside shaft 16 when it is installed in the reverse position shown in FIG. 6.

The stand 10 can be installed on a base 12 by threading threaded extension 44 (FIG. 8) into internal threads in the base. Threaded extension 44 is installed in the lower end of shaft 14 by a plug 46 and pin 48.

Inner shaft 16 is spaced radially inward from outer shaft 14 by annular indentation 50 (FIG. 9) in the outer shaft and by enlarged end 52 (8) of the inner shaft.

An alternate structure for top member 32 is shown in FIG. 11. Nylon rod 131 and nylon enlarged base 137 are made separate pieces.

OPERATION

The stand is transported in the collapsed condition shown in FIG. 6, with top member 32 installed in the reverse position with only knurled end 42 showing. To set up the stand, member 32 is unscrewed, withdrawn, and then reinstalled in its upright position with knurled end 42 inside shaft 16 and with nylon rod 31 extending outward. The height of top member 32 is adjusted by extending inner shaft 16 outward from shaft 14 using clutch collar 18. The clutch collar is rotated to loosen the grip of inner element 28 on the inner shaft, and after the inner shaft is adjusted to the desired height, collar 18 is retightened. The stand can be then threaded onto base 12 using threaded extension 44.

Any one of three instruments can be supported on the stand. A musician would normally only use two instruments, using the stand to support the one not being played. A piccolo 40 is guided onto the stand via nylon rod 31 with its rounded upper end, and is supported on flared surface 38, as shown in FIG. 5. An ordinary flute 70 is supported on the upper portion of rubber sleeve 20 of clutch collar 18, as shown in FIG. 4, and by shaft 16 and member 32, which project into the flute. Member 32 acts as a pilot in centering the flute onto shaft 16 during installation. An alto flute (having a larger internal diameter than an ordinary flute) can be supported either directly on base 12 or on a support ring of protective material (not shown) surrounding shaft 14 at its base. A recorder could also be supported on either base 12, collar 18, or surface 38 of the top member.

As illustrated in FIGS. 13 and 14, piccolo 40 and flute 70 can be rapidly interchanged on stand 10. Nylon and rubber surfaces contact the piccolo and flute as a precaution against harm to their delicate surfaces (e.g., gold and fine woods).

Other embodiments of the invention will occur to those skilled in the art, and are within the scope of the following claims. For example, the rubber exterior sleeve 20 could be eliminated, and inner shaft 16 could be solid and hollowed just enough to receive top member 32 installed in the reverse position.

What is claimed is:

1. A stand for musical instruments, comprising:
   an inner shaft,
   said inner shaft having internal threads on its upper end and having an external diameter less than the internal diameter of a first hollow musical instrument, and having a hollow interior portion,
   and outer hollow tubular shaft,
   said outer shaft telescopically receiving said inner shaft and having external threads on its upper end,
   a clutch collar at the upper end of said outer shaft and with internal threads that mate with said external threads of said outer shaft,
   said clutch collar being adapted, upon tightening thereupon, to grip said inner shaft to a preselected adjustable region along its length, to firmly set the height of said inner shaft, and
   said clutch collar including an upper annular surface for supporting one end of said first hollow musical instrument, and
   a top member, including an elongated extension protruding upward from said inner shaft, said extension having a diameter sized to fit within said hollow interior portion of said inner shaft and less than the internal diameter of said second hollow musical instrument,
   in the region of union of said inner shaft and said extension there being an upwardly exposed portion enlarged relative to said extension, said enlarged portion having an annular surface for supporting one end of said second hollow musical instrument, and
   means at the lower end of said outer shaft for connecting said outer shaft to a base,
   whereby, when playing said first and second hollow musical instrument,
   said second instrument can be supported on said elongated extension and annular surface of said enlarged portion while said first instrument is played
   said first instrument can be supported on the protruding end of said inner shaft and said annular surface of said collar while said second instrument is played,
   said elongated extension of said top member has a diameter less than the internal diameter of said inner shaft and the interior of said innershaft is shaped to receive said elongated extension and
   the interior of said outer shaft can telescopically receive substantially all of said inner shaft,
   whereby, for compact storage,
   said top member can be stored inside said inner shaft and
   said inner shaft containing said top member can be stored inside said outershaft by releasing said collar and telescopically sliding said inner shaft inside said outer shaft.

2. The stand of claim 1 wherein said top member has external threads that mate with internal threads of said inner shaft and said top member can be stored inside said inner shaft by unthreading it from said inner shaft and rethreading it in reverse position inside said inner shaft.

3. The stand of claim 1 or 2 wherein said first hollow musical instrument is a flute and said second hollow musical instrument is a piccolo.

4. The stand of claim 1 or 2 wherein the outer diameter of said outer shaft and the outer diameter of said clutch collar are less than the internal diameter of a third hollow musical instrument, whereby said stand can support any one of three different musical instruments.

5. The stand of claim 4 wherein said third musical instrument is an alto flute.

6. The stand of claim 1 or 2 wherein said enlarged portion in the region of union of said inner shaft and top member comprises an enlarged part of said top member.

7. The stand of claim 6 wherein said elongated extension and said enlarged portion are made of nylon, to provide a surface for protecting the delicate surfaces of said second musical instrument.

8. The stand of claim 6 wherein said enlarged portion is smaller than the internal diameter of said inner tube and is insertable therewithin when the instrument is collapsed.

9. The stand of claim 1 wherein said annular surface of said collar is a deformable material for protecting the delicate surfaces of said first musical instrument.

* * * * *